(12) United States Patent
Shen et al.

(10) Patent No.: US 11,886,311 B2
(45) Date of Patent: Jan. 30, 2024

(54) INTRA-CLASS ADAPTATION FAULT DIAGNOSIS METHOD FOR BEARING UNDER VARIABLE WORKING CONDITIONS

(71) Applicant: SOOCHOW UNIVERSITY, Suzhou (CN)

(72) Inventors: Changqing Shen, Suzhou (CN); Xu Wang, Suzhou (CN); Jing Xie, Suzhou (CN); Aiwen Zhang, Suzhou (CN); Dong Wang, Suzhou (CN); Xiaofeng Shang, Suzhou (CN); Dongmiao Song, Suzhou (CN); Xingxing Jiang, Suzhou (CN); Jun Wang, Suzhou (CN); Juanjuan Shi, Suzhou (CN); Weiguo Huang, Suzhou (CN); Zhongkui Zhu, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 165 days.

(21) Appl. No.: 17/616,663

(22) PCT Filed: Aug. 4, 2020

(86) PCT No.: PCT/CN2020/106705
§ 371 (c)(1),
(2) Date: Dec. 5, 2021

(87) PCT Pub. No.: WO2021/243838
PCT Pub. Date: Dec. 9, 2021

(65) Prior Publication Data
US 2022/0327035 A1 Oct. 13, 2022

(30) Foreign Application Priority Data
Jun. 3, 2020 (CN) .......................... 202010496380.8

(51) Int. Cl.
*G06F 11/00* (2006.01)
*G06F 11/22* (2006.01)
*G06N 3/08* (2023.01)

(52) U.S. Cl.
CPC ............ *G06F 11/2263* (2013.01); *G06N 3/08* (2013.01)

(58) Field of Classification Search
CPC .............................. G06F 11/2263; G06N 3/08
(Continued)

(56) References Cited

U.S. PATENT DOCUMENTS

| 8,930,775 B2 * | 1/2015 | Notohardjono ......... G06F 1/206 714/47.2 |
| 2006/0168481 A1 * | 7/2006 | Nemoto .............. G06F 11/0715 714/E11.2 |

(Continued)

FOREIGN PATENT DOCUMENTS

| CN | 104792530 A | 7/2015 |
| CN | 109765053 A | 5/2019 |

(Continued)

OTHER PUBLICATIONS

Li, Bo & Chow, Martina & Tipsuwan, Yodyium & Hung, J.C.. (2000). Neural-network-based motor rolling bearing fault diagnosis. Industrial Electronics, IEEE Transactions on. 47. 1060-1069. 10.1109/41.873214. (Year: 2000).*

*Primary Examiner* — Sarai E Butler
(74) *Attorney, Agent, or Firm* — SZDC Law PC

(57) ABSTRACT

The invention relates to a fault diagnosis method for a rolling bearing under variable working conditions. Based on a convolutional neural network, a transfer learning algorithm is combined to handle the problem of the reduced universality of deep learning models. Data acquired under different working conditions is segmented to obtain samples. The samples are preprocessed by using FFT. Low-level (Continued)

features of the samples are extracted by using improved ResNet-50, and a multi-scale feature extractor analyzes the low-level features to obtain high-level features as inputs of a classifier. In a training process, high-level features of training samples and test samples are extracted, and a conditional distribution distance between them is calculated as a part of a target function for backpropagation to implement intra-class adaptation, thereby reducing the impact of domain shift, to enable a deep learning model to better carry out fault diagnosis tasks.

8 Claims, 7 Drawing Sheets

(58) Field of Classification Search
USPC .......................................................... 714/1–57
See application file for complete search history.

(56) References Cited

U.S. PATENT DOCUMENTS

| 2014/0270431 | A1* | 9/2014 | Xu ...................... G06F 18/2414 |
| | | | 382/128 |
| 2014/0281726 | A1* | 9/2014 | Garrett ................ G06F 11/3495 |
| | | | 714/37 |
| 2017/0185897 | A1* | 6/2017 | Droppo ................ G06F 11/0721 |
| 2019/0122120 | A1* | 4/2019 | Wu ........................ G06N 3/084 |
| 2019/0370071 | A1* | 12/2019 | Matveev ................ G06N 3/084 |
| 2019/0385055 | A1 | 12/2019 | Sim |
| 2020/0342306 | A1* | 10/2020 | Giovannini .............. G06N 3/08 |

FOREIGN PATENT DOCUMENTS

| CN | 109902399 A | 6/2019 |
| CN | 109947086 A | 6/2019 |

* cited by examiner

| Layer name | Output size | Number of filters, if used |
|---|---|---|
| Input | 3×224×224 | - |
| convolution 1 | 64×112×112 | 64×7×7, stride=2 |
| BN/ReLu | 64×112×112 | - |
| max pooling | 64×56×56 | 64×3×3, stride=2 |
| residual block 1, convolution 2_x | 256×56×56 | $\begin{bmatrix} 64 \times 1 \times 1 \\ 64 \times 3 \times 3 \\ 256 \times 1 \times 1 \end{bmatrix} \times 3$ |
| residual block 2, convolution 3_x | 512×28×28 | $\begin{bmatrix} 128 \times 1 \times 1 \\ 128 \times 3 \times 3 \\ 512 \times 1 \times 1 \end{bmatrix} \times 4$ |
| residual block 3, convolution 4_x | 1024×14×14 | $\begin{bmatrix} 256 \times 1 \times 1 \\ 256 \times 3 \times 3 \\ 1024 \times 1 \times 1 \end{bmatrix} \times 6$ |
| residual block 4, convolution 5_x | 2048×7×7 | $\begin{bmatrix} 512 \times 1 \times 1 \\ 512 \times 3 \times 3 \\ 2048 \times 1 \times 1 \end{bmatrix} \times 3$ |
| ReLu | 2048×7×7 | - |
| average pooling | 2048×1 | 2048×7×7 |
| 1000-d fc, softmax | 1000 | - |

FIG. 3

INTRA-CLASS ADAPTATION FAULT DIAGNOSIS METHOD FOR BEARING UNDER VARIABLE WORKING CONDITIONS

This application is the National Stage Application of PCT/CN2020/106705, filed on Aug. 4, 2020, which claims priority to Chinese Patent Application No. 202010496380.8, filed on Jun. 3, 2020, which is incorporated by reference for all purposes as if fully set forth herein.

FIELD OF THE INVENTION

The present invention relates to the fields of mechanical fault diagnosis and computer artificial intelligence technologies, and more particularly to an intra-class adaptation fault diagnosis method for a bearing under variable working conditions based on a convolutional neural network and transfer learning.

DESCRIPTION OF THE RELATED ART

With the development of industry in recent years, there is increasingly high requirement for long-time safe and reliable running of mechanical equipment. To avoid major economic loss and bodily injury, the development and application of fault diagnosis technologies become an important means for improving the safety and stability of mechanical systems. In the fault diagnosis technologies, the running status of the equipment is monitored to determine the position of a fault and inspect potential safety hazards in time. Therefore, to prevent catastrophic accidents, it is particularly important to enhance the status monitoring of the mechanical equipment to accurately recognize a fault in time. A rolling bearing is one of the key components of a rotary machine, and the health status of the rolling bearing directly affects the stability of the entire rotary machine. However, the rolling bearing remains in severe operating conditions such as high temperature, heavy load, and high speed for a long time and is prone to faults such as wear, cracks, and fractures, to severely jeopardize the safe running of the entire rotary system. Therefore, researches on status information of a rolling bearing and corresponding fault diagnosis technologies are of proactive and great significance to ensure safe and reliable running of the mechanical equipment, improve the production and operation efficiency, and protect human safety.

A lot of researches show that bearing vibration data is an effective basis for fault diagnosis. Conventional fault diagnosis methods include fault feature frequency extraction based on a vibration signal, short-time Fourier transform, empirical mode decomposition, a sparse representation method, and the like. These conventional fault diagnosis methods usually depend on particular a priori knowledge and require professional signal processing technologies and manual extraction of appropriate features, and are therefore not applicable to the processing of massive amount of vibration data. For deficiencies in the conventional fault diagnosis methods, deep learning is widely applied to the field of fault diagnosis. An artificial intelligence-based fault diagnosis framework usually includes four stages: data acquisition, model establishment, model training, and model verification. A deep learning-based fault diagnosis method can automatically extract features, increase computing speed, and meet the requirement of processing massive amount of information in the era of big data. In addition, a deep learning model does not require manual extraction of features, and the deep learning model can automatically learn features without a large amount of priori knowledge. The development of computer technologies also promotes the vigorous development of deep learning-based fault diagnosis technologies.

In conventional deep learning methods for fault diagnosis, it is assumed that training data and test data obey the same distribution, and prominent achievements have been made. However, this assumption is rather questionable in actual industrial applications. In one aspect, a rotary machine is usually in an operating environment with complex rotational speeds and loads, and historical data used for training a model and real-time data acquired during actual status monitoring of equipment conform to different distributions, resulting in reduced universality and generalization of a model based on a conventional deep learning method. In another aspect, during actual applications, it is hardly possible to acquire sufficient vibration data of each type of equipment status under all working conditions to train a specific model to meet diagnosis requirement.

SUMMARY OF THE INVENTION

To resolve the foregoing technical problems, an object of the present invention is to provide a highly accurate and effective intra-class adaptation fault diagnosis method for a bearing under variable working conditions, to improve the accuracy and effectiveness of fault diagnosis for a rolling bearing under variable working conditions. The method includes the following steps:

Step 1: acquiring bearing vibration data in different health states under different working conditions, using the bearing vibration data in the different health states under each working condition as one domain, where data in different domains conforms to different distributions, and segmenting the data to form samples;

Step 2: performing an FFT on samples in a source domain and samples in a target domain, and feeding labeled samples in the source domain and unlabeled samples in the target domain at the same time into a deep intra-class adaptation convolutional neural network model with initialized parameters in a training stage;

Step 3: extracting low-level features of the samples by using improved ResNet-50 in the deep intra-class adaptation convolutional neural network model, performing, by a multi-scale feature extractor, further analysis based on the low-level features to obtain high-level features as an input of a classifier, and at the same time calculating the conditional distribution distance between the high-level features of the samples in the two domains;

Step 4: combining the conditional distribution distance between the source domain and the target domain and classification loss of samples in the source domain to form a target function, optimizing the target function by using a stochastic gradient descent (SGD) method, and training the parameters of the model; and Step 5: inputting a sample set of the target domain into a trained deep neural network diagnosis model, qualitatively and quantitatively determining a fault type and a fault size of each test sample by using an actual outputted label value, performing comparison with labels that are marked in advance but do not participate in training, to obtain diagnosis accuracy to verify the universality and generalization of the present invention.

In an embodiment, Step 1 specifically includes the following steps:

Step 1.1: establishing data sets of different workloads (that is, different working conditions), where each data set is named after a workload of the data set, data in the data sets conforms to different distributions, and each data set includes a normal bearing state, an outer ring fault, an inner ring fault, and different fault sizes; and Step 1.2: segmenting samples with N consecutive sampling points as one sample length to make a data set, and using $\mathcal{D}_s=\{(x_i^s, y_i^s)\}n_s-1$ (i=0) in the present invention, where $y_i^s \in \{0, 1, 2, \ldots, C-1\}$ represents a source domain formed by samples with C different types of labels, $x_i^s$ represents an $i^{th}$ sample in the source domain, $y_i^s$ represents a label of the $i^{th}$ sample in the source domain, and $n_s$ is a total quantity of samples in the source domain; using $\mathcal{D}_t=\{x_j^t\}n_t-1$ (j=0) to represent a target domain formed by the unlabeled samples, where $x_j^t$ represents a $j^{th}$ sample in the target domain, and $n_t$ is a quantity of all samples in the target domain; and acquiring data of the source domain in a probability distribution $P_s$, and acquiring data of the target domain in a probability distribution $P_t$, where $P_s \neq P_t$.

In an embodiment, Step 2 specifically includes the following steps:

performing the FFT on the labeled samples in the source domain and the unlabeled samples in the target domain, and converting a time domain signal into a frequency domain signal, where an FFT formula of a time extraction algorithm is shown as follows:

$$X(k) = \sum_{n=0}^{N-1} x(n) W_N^{nk}, 0 \le k \le N-1, W_N = e^{-j\frac{2\pi}{N}} \quad (1)$$

$$\begin{cases} X(k) = X_1(k) + W_N^k X_2(k) \\ X\left(k+\frac{N}{2}\right) = X_1(k) - W_N^k X_2(k) \end{cases}, k = 0, 1, 2, \ldots, \frac{N}{2}-1,$$

where x(n) represents a value of an $n^{th}$ sampling point in an original sample time sequence, and X(k) represents a $k^{th}$ value in a spectrum graph.

In an embodiment, Step 3 specifically includes the following steps:

Step 3.1: modifying the structure of ResNET-50, and removing the last two layers of the model: a global average pooling layer and a fully connected layer used for classification, where the deep intra-class adaptation convolutional neural network model extracts the low-level features of the samples by using the improved ResNet-50, and a process of the extraction is as follows:

$$g(x) = f(x) \quad (2),$$

where x represents a sample in a frequency domain after the FFT, $f(\cdot)$ represents the modified ResNet-50, and g(x) represents the low-level features extracted from the samples by using the improved ResNet-50;

Step 3.2: further analyzing, by a plurality of substructures of the multi-scale feature extractor, the low-level features at the same time to obtain the high-level features as inputs of a softmax classifier, where a process of extracting the high-level features is represented as follows:

$$g(x) = [g_0(x), g_1(x), \ldots, g_{n-1}(x)] \quad (3),$$

where $g_i(x)$ is the output of one substructure, $i \in \{0, 1, 2, \ldots, n-1\}$, and n is the total quantity of substructures in the feature extractor; and the softmax function is represented as follows:

$$q_i = \frac{e^{v_i}}{\sum_{i=0}^{C-1} e^{v_i}}, \quad (4)$$

where $q_i$ represents the probability that a sample belongs to the label i, C is the total quantity of label classes, and $v_i$ is the value of the $i^{th}$ position of an input of the softmax function; and Step 3.3: calculating the conditional distribution distance between the high-level features in the source domain and the target domain, where a formula for a conditional distance between features extracted by one substructure of the multi-scale feature extractor is as follows:

$$d_H(X_s, X_t) = \frac{1}{C}\sum_{c=0}^{C-1} \left\| \frac{1}{n_s^{(c)}} \sum_{i=0}^{n_s^{(c)}-1} \Phi(x_i^{s(c)}) - \frac{1}{n_t^{(c)}} \sum_{j=0}^{n_t^{(c)}-1} \Phi(x_j^{t(c)}) \right\|_H^2, \quad (5)$$

where H represents the reproducing kernel Hilbert space, and $\Phi(\cdot)$ represents a function of feature space mapping; $x_i^{s(c)}$ represents the $i^{th}$ sample in samples with a label of c in the source domain, $n_s^{(c)}$ is equal to the quantity of all samples with the label of c in the source domain, $x_j^{t(c)}$ represents the $j^{th}$ sample in samples with a pseudo label of c in the target domain, and $n_t^{(c)}$ is equal to the quantity of all samples with the pseudo label of c in the target domain; the foregoing expression is used for estimating a difference between intra-class condition distributions $P_s(x_s|y_s=c)$ and $P_t(x_t|y_t=c)$; the conditional distribution difference between the source domain and the target domain can be reduced by minimizing the foregoing expression; and because the high-level features are extracted by the plurality of substructures at the same time, a total conditional distribution distance is as follows:

$$d(X_s, X_t) = \sum_{i=0}^{n-1} d(g_i(X_s), g_i(X_t)), \quad (6)$$

where $g_i(x)$ is the output of one substructure, $i \in \{0, 1, 2, \ldots, n-1\}$, and n is the total quantity of substructures in the feature extractor.

In an embodiment, Step 4 specifically includes the following steps:

Step 4.1: calculating classification loss of the samples in the source domain in the training process, where a process of the calculation is shown by the following formula:

$$\text{loss}_{classifier}(y, X) = \frac{1}{n}\sum_{i=0}^{n-1} J(y_i, F(x_i)), \quad (7)$$

where X represents a set of all samples in the source domain, and y represents a set of actual labels of all the samples in the source domain; n is the quantity of samples that participate in training, $y_i$ is the actual label of an $i^{th}$ sample, and $F(x_i)$ is the predicted result of the $i^{th}$ sample by a neural network; and $J(\cdot,\cdot)$ represents a cross entropy loss function, and is defined as follows:

$$J(p, q) = -\sum_{i=0}^{C-1} p_i \log(q_i), \tag{8}$$

where when i is the actual label of the sample, $p_i$ is equal to 1, or otherwise, $p_i$ is equal to 0; $q_i$ is a probability outputted after softmax activation function; and C is the total quantity of label classes; and Step 4.2: combining the conditional distribution distance and classification loss of the samples in the source domain to form a multi-scale high-level feature alignment target function to be optimized, where a formula of the target function is as follows:

$$l_{total} = \min l_{classifier}(y_s, X_s) + \lambda \sum_{i=0}^{n_{sub}-1} d(g_i(X_s), g_i(X_t)) \tag{9}$$

$$= \min_F \frac{1}{n_s} \sum_{i=0}^{n_s-1} J(y_i^s, F(x_i^s)) + \lambda \sum_{i=0}^{n_{sub}-1} d_H(g_i(X_s), g_i(X_t)),$$

where $F(\cdot)$ represents a model output function, $g(\cdot)$ represents an output of one substructure in the multi-scale feature extractor, $J(\cdot,\cdot)$ represents the cross entropy loss function, $\lambda > 0$ is a superparameter, $n_{sub}$ is equal to a quantity of substructures in the multi-scale feature extractor, and $d_H(\cdot,\cdot)$ is the conditional distribution distance; the foregoing expression may be used to enable the network $F(\cdot)$ provided from training to accurately predict labels of samples from the target domain; and the superparameter $\lambda$ in the foregoing expression is set as follows:

$$\lambda = \frac{2}{1 + e^{\frac{-10^* epoch}{epochs}}} - 1, \tag{10}$$

where epochs is the total quantity of times of training, and epoch is the current quantity of training steps; and Step 4.3: minimizing the multi-scale high-level feature alignment target function by using the SGD method, updating the parameters of the model, and training the model:

$$\theta_i < ?\theta_i / \alpha \frac{\partial}{\partial \theta_i} l^* \pounds +, \tag{11}$$

where $\theta$ is all the parameters of the model, and $\theta_i$ represents the $i^{th}$ parameter; and $l(\theta)$ represents a target function related to the parameter $\theta$, and $\alpha$ is a learning rate, that is, a step size.

In an embodiment, Step 5 specifically includes the following steps:

feeding the unlabeled samples in the target domain into a trained multi-scale deep intra-class adaptation convolutional neural network model to obtain predicted labels of all samples in the target domain, and performing comparison with labels that are manually marked in advance but do not participate in a training process, to obtain diagnosis accuracy to verify the high quality of the model, where a formula for calculating the diagnosis accuracy is as follows:

$$acc = \frac{1}{n_t} \sum_{i=0}^{n_t-1} \text{sign}\,(F(x_i^t) = (y_i^t), \tag{12}$$

where sign( ) represents an indication function, $y_i^t$ is the actual label of the $i^{th}$ sample in the target domain, $F(x_i^t)$ is the predicted result of the $i^{th}$ sample in the target domain by the model, and $n_t$ is the total quantity of samples in the target domain.

The invention also provides a computer device, including a memory, a processor, and a computer program that is stored on the memory and is executable by the processor, where the processor is configured to execute the program to implement the steps in any foregoing method.

The invention further provides a computer-readable storage medium, on which a computer program is stored, where the program is executed by a processor to implement the steps in any foregoing method.

The invention further provides a processor, which is configured to execute a program, where the program is executed to perform any foregoing method.

By means of the foregoing solutions, the present invention has the following advantages:

1. Manual feature extraction from a large amount of priori knowledge is not required, the training of a neural network is accelerated by using computer hardware, and real-time monitoring is used to predict the health status of equipment in time, thereby achieving an online diagnosis effect, saving a large amount of manpower and material resources, and improving the production and operation efficiency.

2. A convolutional neural network and a transfer learning algorithm are combined, and the conditional distribution distance between samples in a source domain and samples in a target domain is calculated as a part of the target function for optimization, to adequately eliminate the bottleneck that the further development of deep learning in the field of fault diagnosis is hindered because the assumption that data in a training set and data in a test set obey the same distribution in conventional deep learning is questionable in actual industrial applications, so that a model can better process bearing vibration data under variable working conditions, thereby greatly improving the universality and generalization of the model, and the model is widely applicable to fault diagnosis tasks under variable working conditions of complex systems such as mechanical systems, metallurgical systems, electrical systems, and aviation systems.

The foregoing description is merely brief description of the technical solution of the present invention. For a clearer understanding of the technical measure of the present invention and implementation according to the content of the specification, the preferred embodiments of the present invention are described below in detail with reference to the accompanying drawings.

BRIEF DESCRIPTION OF THE DRAWINGS

FIG. 3 is a detailed structural diagram of ResNet-50 in a deep learning model according to the present invention.

DETAILED DESCRIPTION OF THE PREFERRED EMBODIMENTS

Specific implementations of the present invention are further described below in detail with reference to the accompanying drawings and embodiments. The following embodiments are used to describe the present invention, but are not used to limit the scope of the present invention.

The present invention is described below in detail with reference to actual experimental data:

The experimental data uses a bearing data set from Case Western Reserve University. A data acquisition system is formed by three major parts: a motor, a torque sensor, and a dynamometer machine. An accelerometer is utilized to acquire vibration data, and the sampling frequency is 12 KHz. Faults are introduced into the roller, the inner ring, and the outer ring by using electrical discharge machining (EDM) technologies, and different fault sizes are set.

Figure 1:
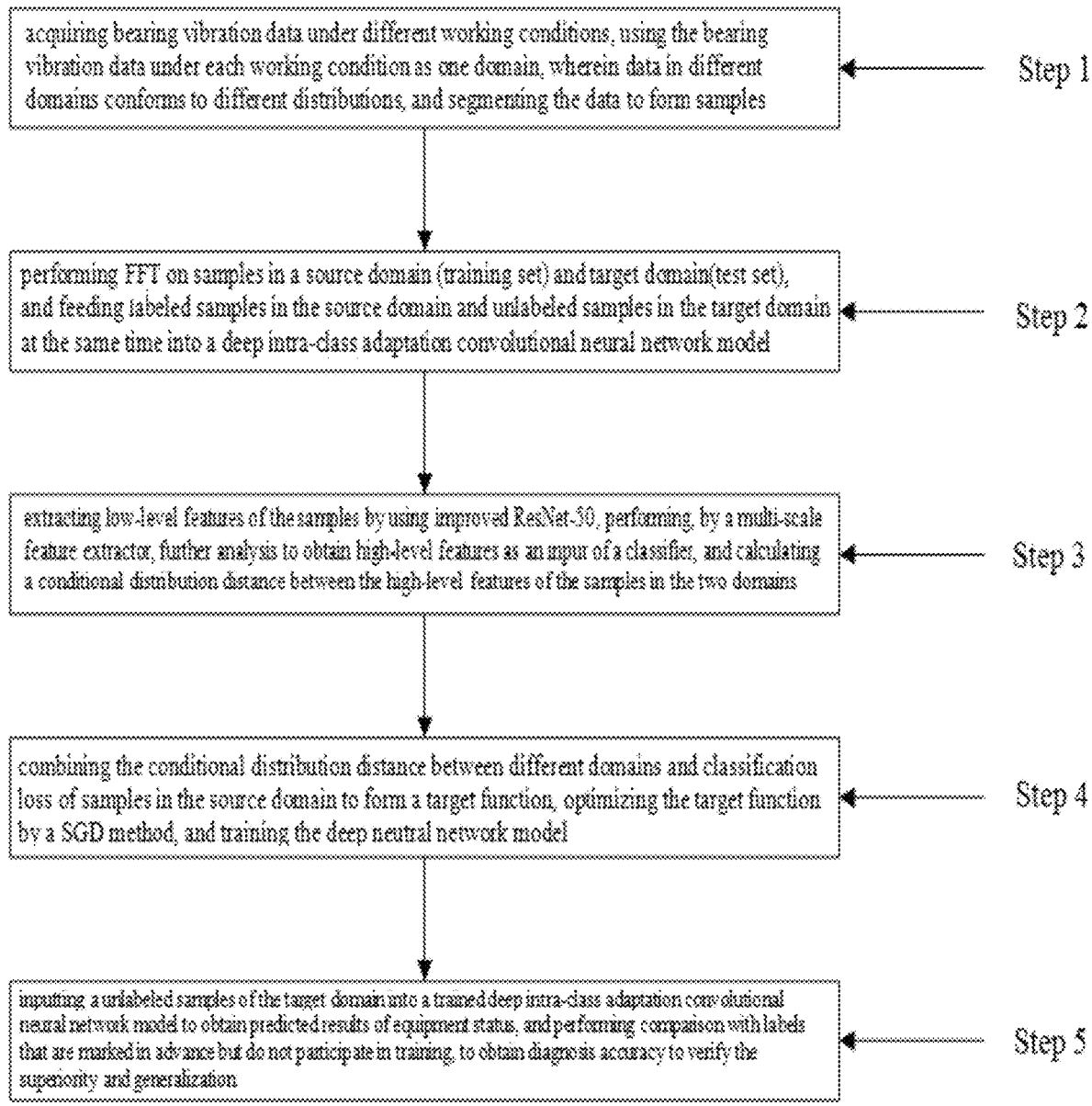
FIG. 1 shows the steps of a fault diagnosis method for a rolling bearing under variable working conditions based on a convolutional neural network and transfer learning according to the present invention.

As shown in FIG. 1, the present invention includes the following steps:

Step 1: acquiring bearing vibration data in different health states under different working conditions, using the bearing vibration data in the different health states under each working condition as one domain, where data in different domains conforms to different distributions, and segmenting the data to form samples;

Step 2: performing an FFT on samples in a source domain and samples in a target domain, and feeding labeled samples in the source domain and unlabeled samples in the target domain at the same time into a deep intra-class adaptation convolutional neural network model with initialized parameters in a training stage;

Step 3: extracting low-level features of the samples by using improved ResNet-50 in the deep intra-class adaptation convolutional neural network model, performing, by a multi-scale feature extractor, further analysis based on the low-level features to obtain high-level features as inputs of a classifier, and at the same time calculating the conditional distribution distance between the high-level features of the samples in the two domains;

Step 4: combining the conditional distribution distance between the source domain and the target domain and classification loss of samples in the source domain to form the target function, optimizing the target function by using an SGD method, and training the parameters of the model; and Step 5: inputting a sample set of the target domain into a trained deep neural network diagnosis model, qualitatively and quantitatively determining a fault type and a fault size of each test sample by using actual outputted label values, and performing comparison with labels that are marked in advance but do not participate in training, to obtain diagnosis accuracy to verify the universality and generalization of the present invention.

Further, Step 1 specifically includes the following steps:

Step 1.1: Establishing data sets of different workloads (that is, different working conditions), where each data set is named after a workload of the data set, data in the data sets conforms to different distributions, and each data set includes a normal bearing state, an outer ring fault, an inner ring fault, and different fault sizes.

In this embodiment, data sets (0, 1, 2 and 3 hp) under four different working conditions are established. That is, variable loads are used to simulate a transfer learning task of a rolling bearing under variable working conditions. These data sets are named after the workloads of the data sets. For example, a data set 0 hp represents that samples come from vibration signals acquired under 0 hp workload. Therefore, the four data sets of variable loads represent four domains with different data distributions. Single-point faults are created at the roller, the inner ring, and the outer ring of a bearing by using the EDM technologies, and fault degrees are 0.007 inches, 0.014 inches, and 0.021 inches respectively.

Step 1.2: Segmenting samples with N consecutive sampling points as one sample length to make a data set, and using $\mathcal{D}_s=\{(x_i^s, y_i^s)\}n_s-1$ (i=0) in the present invention, where $y_i^s \in \{0, 1, 2, \ldots, C-1\}$ represents a source domain formed by samples with C different types of labels, $x_i^s$ represents the $i^{th}$ sample in the source domain, $y_i^s$ represents the label of the $i^{th}$ sample in the source domain, and $n_s$ is the total quantity of samples in the source domain; using $\mathcal{D}_t=\{x_j^t\}n_t-1$ (j=0) to represent a target domain formed by the unlabeled samples, where $x_j^t$ represents the $j^{th}$ sample in the target domain, and $n_t$ is the quantity of all samples in the target domain; and acquiring data of the source domain in a probability distribution $P_s$, and acquiring data of the target domain in a probability distribution $P_t$, where $P_s \neq P_t$. For specific types of samples in each domain, reference may be made to Table 1.

TABLE 1

Detailed description of 10 types of samples in each domain

| Fault size/inch | Status | Label | Sample quantity | Symbol representation |
|---|---|---|---|---|
| — | Normal | 0 | 200 | NO |
| 0.007 | Inner ring fault | 1 | 200 | IF07 |
| 0.007 | Roller fault | 2 | 200 | BF07 |
| 0.007 | Outer ring fault | 3 | 200 | OF07 |
| 0.014 | Inner ring fault | 4 | 200 | IF14 |
| 0.014 | Roller fault | 5 | 200 | BF14 |
| 0.014 | Outer ring fault | 6 | 200 | OF14 |
| 0.021 | Inner ring fault | 7 | 200 | IF21 |
| 0.021 | Roller fault | 8 | 200 | BF21 |
| 0.021 | Outer ring fault | 9 | 200 | OF21 |

A diagnosis task under variable working conditions is represented by a symbol A hp→B hp. The source domain is a hp data set. All samples and labels of the samples participate in a training process. B hp represents the target domain, and actual labels of samples in the target domain do not participate in training and are only used for verification process.

Figure 6:
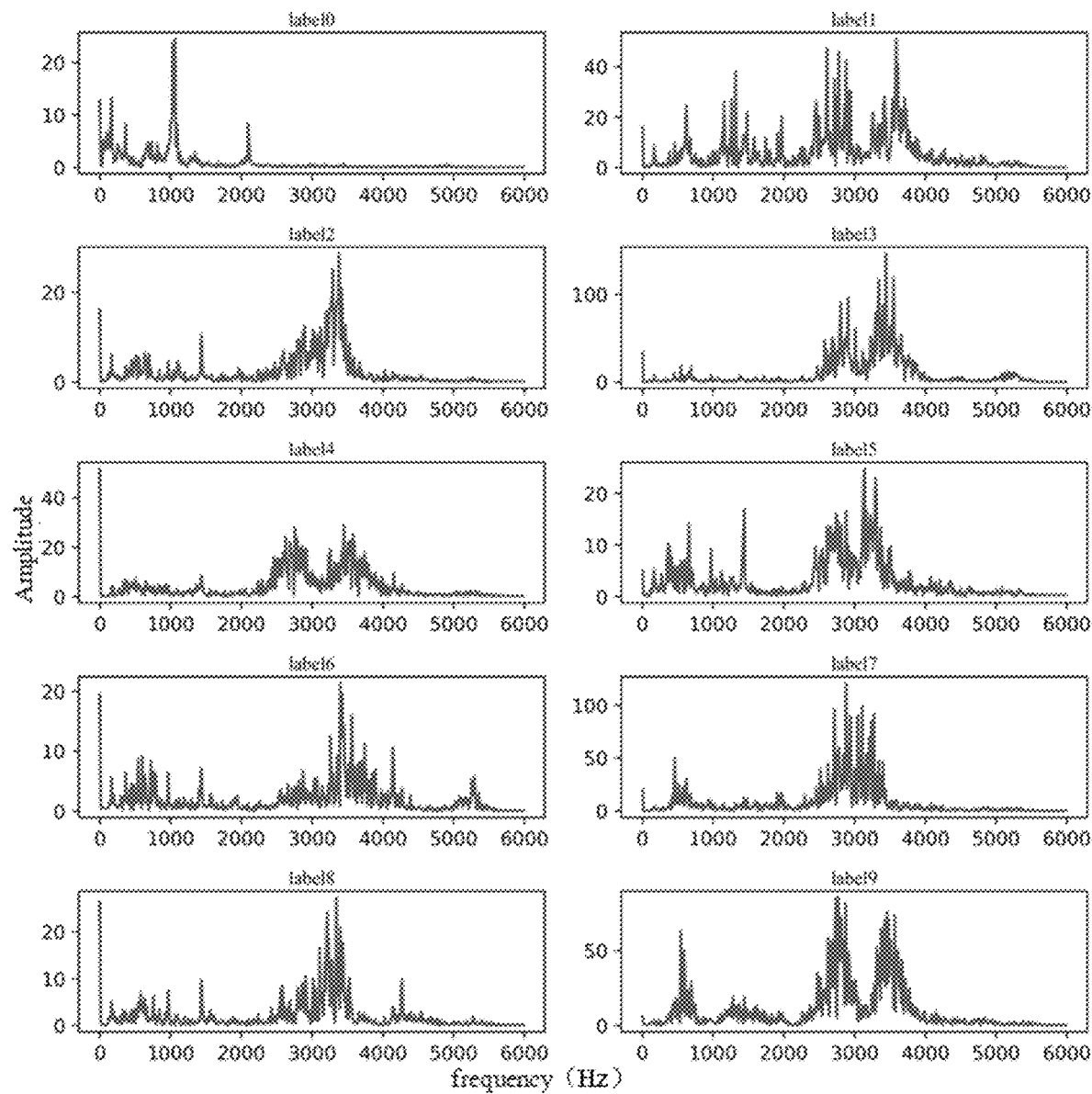
FIG. 6 is a diagram of a frequency domain of a vibration signal of a bearing in different health states according to an embodiment of the present invention.

Further, Step 2 specifically includes the following steps:
performing the FFT on the labeled samples in the source domain and the unlabeled samples in the target domain, and converting a time domain signal into a frequency domain signal, where an FFT formula of a time extraction algorithm is shown as follows:

$$X(k) = \sum_{n=0}^{N-1} x(n) W_N^{nk}, 0 \le k \le N-1, W_N = e^{-j\frac{2\pi}{N}} \quad (1)$$

$$\begin{cases} X(k) = X_1(k) + W_N^k X_2(k) \\ X\left(k + \frac{N}{2}\right) = X_1(k) - W_N^k X_2(k) \end{cases}, k = 0, 1, 2, \ldots, \frac{N}{2} - 1,$$

where x(n) represents the value of the $n^{th}$ sampling point in an original sample time sequence, and X(k) represents the $k^{th}$ value in a spectrum graph. A frequency domain signal of each type of sample is shown in FIG. 6.

Figure 2:
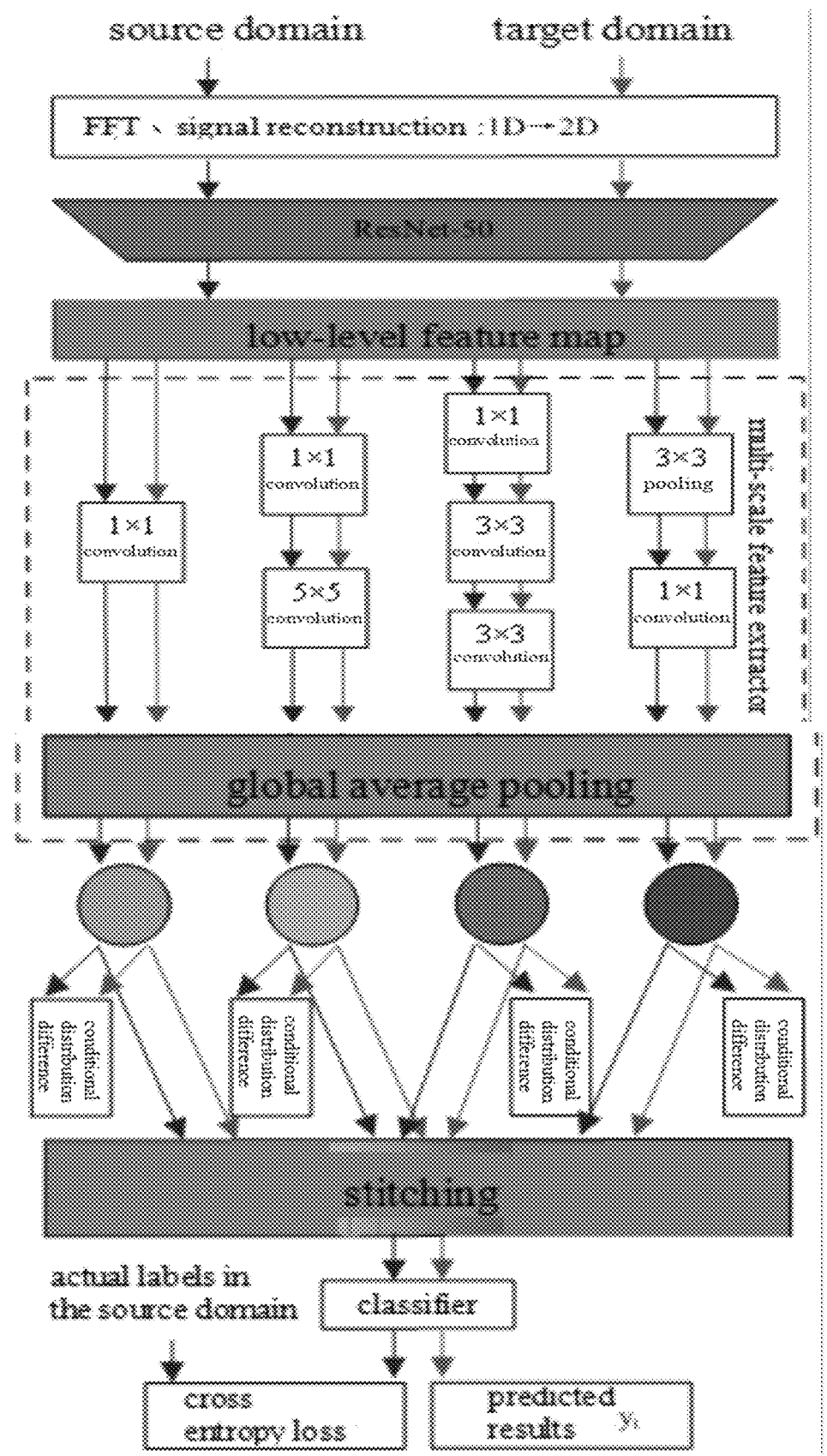
FIG. 2 is a structural diagram of a corresponding deep learning model according to the present invention.
Figure 4:
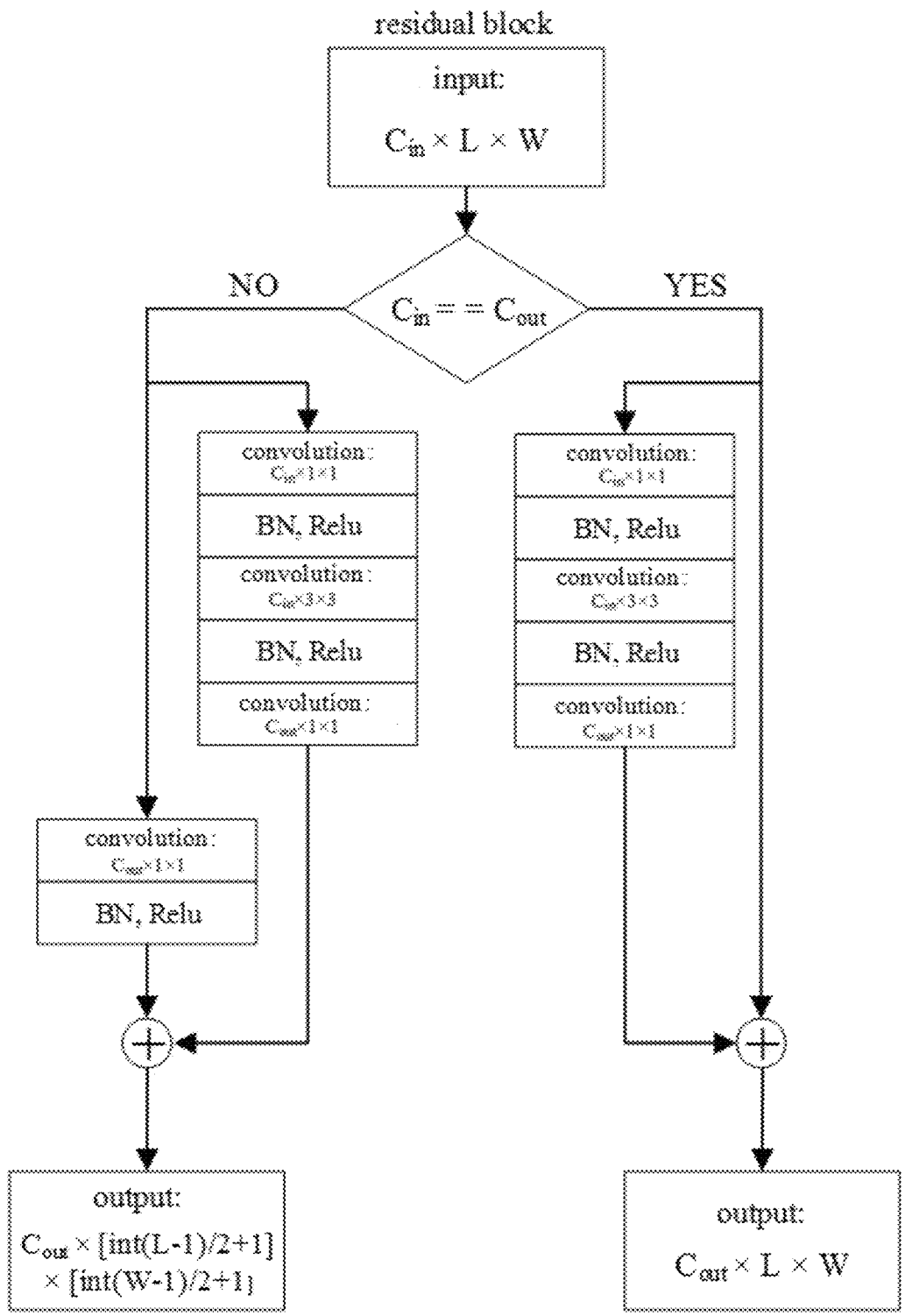
FIG. 4 is a principle diagram of residual blocks in ResNet-50.
Figure 5:
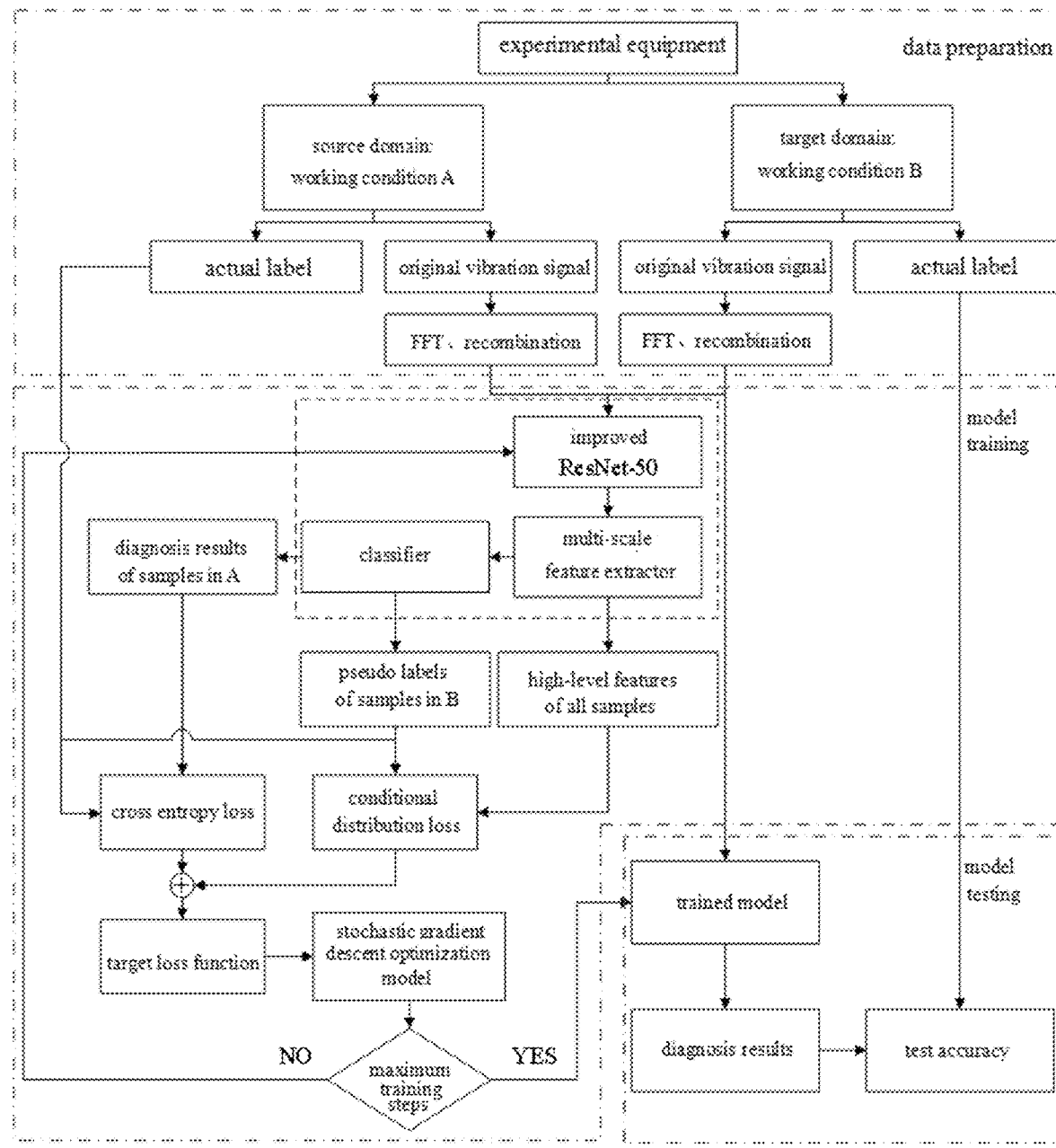
FIG. 5 is a flowchart of a corresponding diagnosis method according to the present invention.

Further, Step 3 specifically includes the following steps:
A deep learning model established in this embodiment is shown in FIG. 2, and a fault diagnosis procedure is shown in FIG. 5, including:
Step 3.1: for a detailed structure of ResNet-50 shown in FIG. 3 and FIG. 4, modifying the structure of ResNet-50, and removing the last two layers of the model: a global average pooling layer and a fully connected layer used for classification, where the deep intra-class adaptation convolutional neural network model extracts the low-level features of the samples by using the improved ResNet-50, and a process of the extraction is as follows:

$$g(x) = f(x) \quad (2),$$

where x represents a sample in a frequency domain after the FFT, $f(\cdot)$ represents the modified ResNet-50, and g(x) represents the low-level features extracted from the samples by using the improved ResNet-50.

Step 3.2: further analyzing, by a plurality of substructures of the multi-scale feature extractor, the low-level features at the same time to obtain the high-level features as an input of the softmax classifier, where a process of extracting the high-level features is represented as follows:

$$g(x) = [g_0(x), g_1(x), \ldots, g_{n-1}(x)] \quad (3),$$

where $g_i(x)$ is an output of one substructure, $i \in \{0, 1, 2, \ldots, n-1\}$, and n is a total quantity of substructures in the feature extractor; and the softmax function is represented as follows:

$$q_i = \frac{e^{v_i}}{\sum_{i=0}^{C-1} e^{v_i}}, \quad (4)$$

where $q_i$ represents the probability that a sample belongs to the label i, C is the total quantity of label classes, and $v_i$ is the value of the $i^{th}$ position of an input of the softmax function; and Step 3.3: calculating the conditional distribution distance between the high-level features in the source domain and the target domain, where a formula for the conditional distance between features extracted by one substructure of the multi-scale feature extractor is as follows:

$$d_H(X_s, X_t) = \frac{1}{C}\sum_{c=0}^{C-1}\left\|\frac{1}{n_s^{(c)}}\sum_{i=0}^{n_s^{(c)}-1}\Phi(X_i^{s(c)}) - \frac{1}{n_t^{(c)}}\sum_{j=0}^{n_t^{(c)}-1}\Phi(X_j^{t(c)})\right\|_H^2, \quad (5)$$

where H represents the reproducing kernel Hilbert space, and $\Phi(\cdot)$ represents a function of feature space mapping; $x_i^{s(c)}$ represents the $i^{th}$ sample in samples with a label of c in the source domain, $n_s^{(c)}$ is equal to the quantity of all samples with the label of c in the source domain, $x_j^{t(c)}$ represents the $j^{th}$ sample in samples with a pseudo label of c in the target domain, and $n_t^{(c)}$ is equal to a quantity of all samples with the pseudo label of c in the target domain; the foregoing expression is used for estimating a difference between intra-class condition distributions $P_s(x_s|y_s=c)$ and $P_t(x_t|y_t=c)$; the conditional distribution difference between the source domain and the target domain can be reduced by minimizing the foregoing expression; and because the high-level features are extracted by the plurality of substructures at the same time, a total conditional distribution distance is as follows:

$$d(X_s, X_t) = \sum_{i=0}^{n-1} d(g_i(X_s), g_i(X_t)), \quad (6)$$

where $g_i(x)$ is the output of one substructure, $i \in \{0, 1, 2, \ldots, n-1\}$, and n is the total quantity of substructures in the feature extractor.

Further, Step 4 specifically includes the following steps:
Step 4.1: calculating classification loss of samples in the source domain, where a process of the calculation is shown by the following formula:

$$loss_{classifier}(y, X) = \frac{1}{n}\sum_{i=0}^{n-1} J(y_i, F(x_i)), \quad (7)$$

where X represents a set of all samples in the source domain, and y represents a set of actual labels of all the samples in the source domain; n is the quantity of samples that participate in training, $y_i$ is the actual label of the $i^{th}$ sample, and $F(x_i)$ is the predicted result of the $i^{th}$ sample by a neural network; and $J(\cdot, \cdot)$ represents the cross entropy loss function, and is defined as follows:

$$J(p, q) = -\sum_{i=0}^{C-1} p_i \log(q_i), \quad (8)$$

where when i is the actual label of the sample, $p_i$ is equal to 1, or otherwise, $p_i$ is equal to 0; $q_i$ is a probability outputted after the softmax activation function; and C is the total quantity of label classes; and Step 4.2: combining the conditional distribution distance and the classification loss of the samples in the source domain to form a multi-scale high-level feature alignment target function to be optimized, where a formula of the target function is as follows:

$$l_{total} = \min l_{classifier}(y_s, X_s) + \lambda \sum_{i=0}^{n_{sub}-1} d(g_i(X_s), g_i(X_t)) \quad (9)$$

$$= \min_F \frac{1}{n_s} \sum_{i=0}^{n_s-1} J(y_i^s, F(x_i^s)) + \lambda \sum_{i=0}^{n_{sub}-1} d_H(g_i(X_s), g_i(X_t)),$$

where $F(\cdot)$ represents a model output function, $g(\cdot)$ represents an output of one substructure in the multi-scale feature extractor, $J(\cdot,\cdot)$ represents the cross entropy loss function, $\lambda > 0$ is a superparameter, $n_{sub}$ is equal to a quantity of substructures in the multi-scale feature extractor, and $d_H(\cdot,\cdot)$ is the conditional distribution distance; the foregoing expression may be used to enable the network $F(\cdot)$ provided from training to accurately predict a label of a sample from the target domain; and the superparameter $\lambda$ in the foregoing expression is set as follows:

$$\lambda = \frac{2}{1 + e^{\frac{-10*epoch}{epochs}}} - 1, \quad (10)$$

where epochs is the total quantity of times of training, and epoch is the current quantity of training steps.

Step 4.3: minimizing the multi-scale high-level feature alignment target function by using the SGD method, updating the parameters of the model, and training the model:

$$\theta_i < ? \theta_i / \alpha \frac{\partial}{\partial \theta_i} l^* \pounds +, \quad (11)$$

where $\theta$ is all the parameters of the model, and $\theta_i$ represents the $i^{th}$ parameter; and $l(\theta)$ represents a target function related to the parameter $\theta$, and $\alpha$ is a learning rate, that is, a step size.

Figure 7:
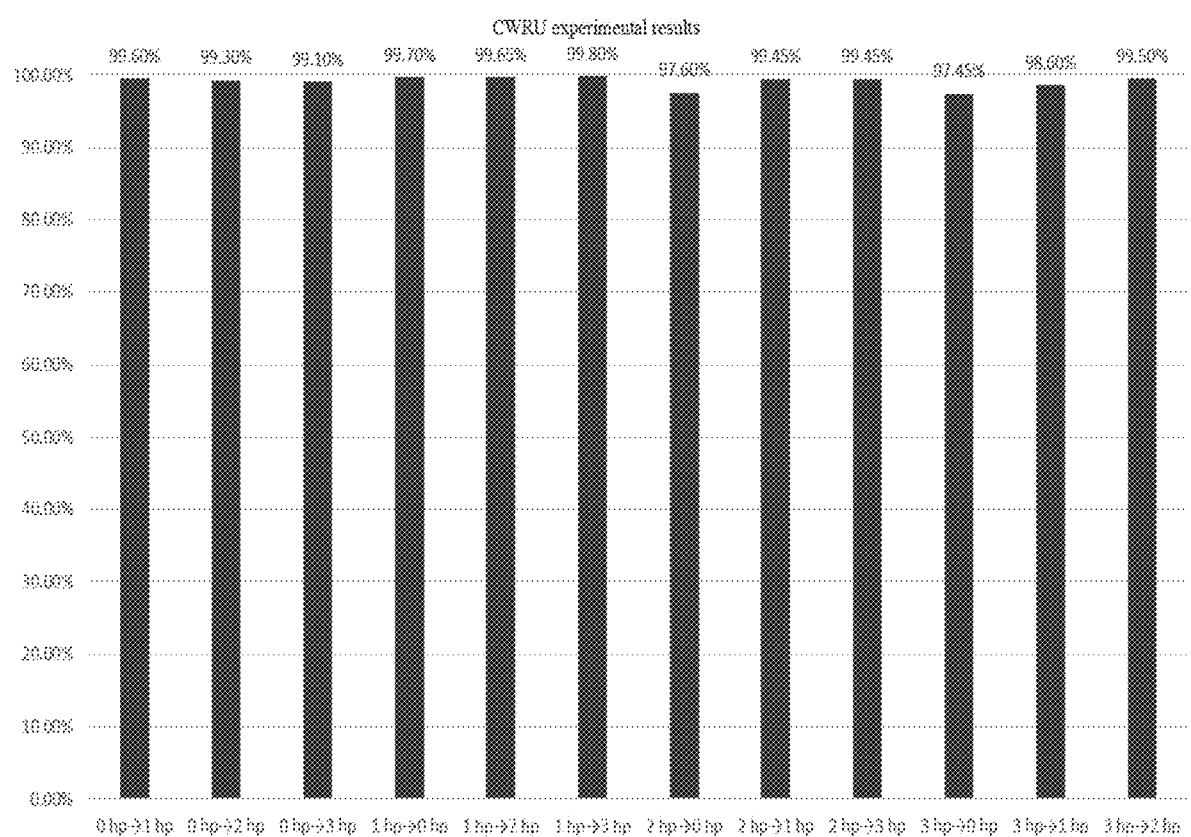
FIG. 7 is a diagram of classification results of a target domain (test set) of bearing faults according to an embodiment of the present invention.

Further, Step 5 specifically includes the following steps: feeding the unlabeled samples in the target domain into a trained multi-scale deep intra-class adaptation convolutional neural network model to obtain predicted labels of all samples in the target domain, and performing comparison with labels that are manually marked in advance but do not participate in the training process, to obtain diagnosis accuracy to verify the high quality of the model, where a formula for calculating the diagnosis accuracy is as follows:

$$acc = \frac{1}{n_t} \sum_{i=0}^{n_t-1} \text{sign}(F(x_i^t) = y_i^t), \quad (12)$$

where sign( ) represents an indication function, $y_i^t$ is the actual label of the $i^{th}$ sample in the target domain, $F(x_i^t)$ is the predicted result of the $i^{th}$ sample in the target domain by the model, and $n_t$ is the total quantity of samples in the target domain. Diagnosis results under 12 variable working conditions are shown in FIG. 7. As can be seen from the diagnosis results, the average accuracy of diagnosis tasks under the 12 variable working conditions reaches 99.10%, and a standard deviation is 0.0080. It indicates that based on the relatively high diagnosis accuracy achieved in the present invention, the universality and generalization of the deep learning model are greatly improved, and the impact of domain shift on a fault diagnosis method based on conventional deep learning under variable working conditions can be adequately handled.

In summary, a multi-scale convolutional intra-class adaptation fault diagnosis model is designed based on a convolutional neural network and a transfer learning algorithm in the present invention. Compared with conventional deep learning methods, the present invention can better mitigate adverse impact of domain shift on a deep learning model, better conform to actual scenarios of industrial applications, and meet the requirement of fault diagnosis under variable working conditions.

The foregoing descriptions are only preferred implementations of the present invention, but are not used to limit the present invention. It should be noted that for a person of ordinary skill in the art, several improvements and variations may further be made without departing from the technical principle of the present invention. These improvements and variations should also be deemed as falling within the protection scope of the present invention.

What is claimed is:

1. A fault diagnosis method for a rolling bearing under variable working conditions based on a convolutional neural network and transfer learning, comprising:

Step 1: acquiring bearing vibration data in different health states under different working conditions, using the bearing vibration data in the different health states under each working condition as one domain, wherein data in different domains conforms to different distributions, and segmenting the data to form samples;

Step 2: performing a fast Fourier transform (FFT) on samples in a source domain and samples in a target domain, and feeding labeled samples in the source domain and unlabeled samples in the target domain at the same time into a deep intra-class adaptation convolutional neural network model with initialized parameters in a training stage;

Step 3: extracting low-level features of the samples by using improved ResNet-50 in the deep intra-class adaptation convolutional neural network model, performing, by a multi-scale feature extractor, further analysis based on the low-level features to obtain high-level features as an input of a classifier, and at the same time calculating a conditional distribution distance between the high-level features of the samples in the two domains;

Step 4: combining the conditional distribution distance between the source domain and the target domain and classification loss of samples in the source domain to form a target function, optimizing the target function by using a stochastic gradient descent (SGD) method, and training the parameters of the model;

Step 5: inputting a sample set of the target domain into a trained deep neural network diagnosis model, qualitatively and quantitatively determining a fault type and a fault size of each test sample by using an actual outputted label value, and performing comparison with labels that are marked in advance but do not participate in training, to obtain diagnosis accuracy, wherein Step 3 comprises:

Step 3.1: modifying a structure of ResNet-50, and removing last two layers of the model: a global average pooling layer and a fully connected layer used for classification, wherein the deep intra-class adaptation convolutional neural network model extracts the low-level features of the samples by using the improved ResNet-50, and a process of an extraction is as follows:

$$g(x)f(x),$$

wherein x represents a sample in a frequency domain after the FFT, $f(\cdot)$ represents the modified ResNet-50, and g(x) represents the low-level features extracted from the samples by using the improved ResNet-50;

Step 3.2: further analyzing, by a plurality of substructures of the multi-scale feature extractor, the low-level features at the same time to obtain the high-level features as an input of a softmax classifier, wherein a process of extracting the high-level features is represented as follows:

$$g(x)=[g_0(x),g_1(x),\ldots,g_{n-1}(x)],$$

wherein $g_i(x)$ is an output of one substructure, $i \in \{0, 1, 2, \ldots, n-1\}$, and n is a total quantity of substructures in the feature extractor; and a softmax function is represented as follows:

$$q_i = \frac{e^{v_i}}{\sum_{i=0}^{C-1} e^{v_i}},$$

wherein $q_i$ represents a probability that a sample belongs to a label i, C is a total quantity of label classes, and $v_i$ is a value of an $i^{th}$ position of an input of the softmax function; and Step 3.3: calculating the conditional distribution distance between the high-level features in the source domain and the target domain, wherein because labels of samples in the target domain are unknown in a training process, it seems impossible to match the conditional distribution distance between the source domain and the target domain, and predetermined results for samples in the target domain by a deep learning model in a training iteration process are used as pseudo labels to calculate the conditional distribution distance between the source domain and the target domain, and a formula for a conditional distribution distance between features extracted by one substructure of the multi-scale feature extractor is as follows:

$$d_H(X_s, X_t) = \frac{1}{C} \sum_{c=0}^{C-1} \left\| \frac{1}{n_s^{(c)}} \sum_{i=0}^{n_s^{(c)}-1} \Phi\left(X_i^{s(c)}\right) - \frac{1}{n_t^{(c)}} \sum_{j=0}^{n_t^{(c)}-1} \Phi\left(X_j^{t(c)}\right) \right\|_H^2,$$

wherein H represents the reproducing kernel Hilbert space, and $\Phi(\cdot)$ represents a function of feature space mapping; $x_i^{s(c)}$ represents an $i^{th}$ sample in samples with a label of c in the source domain, $n_s^{(c)}$ is equal to a quantity of all samples with the label of c in the source domain, $x_j^{t(c)}$ represents a $j^{th}$ sample in samples with a pseudo label of c in the target domain, and $n_s^{(c)}$ is equal to a quantity of all samples with the pseudo label of c in the target domain; a foregoing expression is used for estimating a difference between intra-class condition distributions $P_s(x_s|y_s=c)$ and $P_t(x_t|y_t=c)$; a conditional distribution difference between the source domain and the target domain can be reduced by minimizing the foregoing expression; and because the high-level features are extracted by the plurality of substructures at the same time, a total conditional distribution distance is as follows:

$$d(X_s, X_t) = \sum_{i=0}^{n-1} d\ g_i(X_s), g_i(X_t),$$

wherein $g_i(x)$ is the output of one substructure, $i \in \{0, 1, 2, \ldots, n-1\}$, and n is the total quantity of substructures in the feature extractor; although pseudo labels rather than actual labels of samples in the target domain are used in the training process, as a quantity of iterations increases, a training loss keeps decreasing, and the pseudo labels keep approaching the actual labels, to maximize the accuracy of classifying samples in the target domain.

2. The fault diagnosis method for a rolling bearing under variable working conditions based on a convolutional neural network and transfer learning according to claim 1, wherein Step 1 comprises:

Step 1.1: establishing data sets of different workloads, wherein each data set is named after a workload of the data set, and data in the data sets conforms to different distributions; and Step 1.2: segmenting samples with N consecutive sampling points as one sample length to make a data set, and using $D_s=\{(x_i^s, y_i^s)\}n_s-1$ (i=0), wherein $y_i^s \in \{0, 1, 2, \ldots, C-1\}$ represents a source domain formed by samples with C different types of labels, $x_i^s$ represents an $i^{th}$ sample in the source domain, $y_i^s$ represents a label of the $i^{th}$ sample in the source domain, and $n_s$ is a total quantity of samples in the source domain; using $D_t=\{x_j^t\}n_t-1$ (j=0) to represent a target domain formed by the unlabeled samples, wherein $x_j^t$ represents a $j^{th}$ sample in the target domain, and $n_t$ is a quantity of all samples in the target domain; acquiring data of the source domain in a probability distribution $P_s$, and acquiring data of the target domain in a probability distribution $P_t$, wherein $P_s \neq P_t$, and the data of the source domain and the data of the target domain conform to different distributions.

3. The fault diagnosis method for a rolling bearing under variable working conditions based on a convolutional neural network and transfer learning according to claim 2, wherein in Step 1.2, all labeled samples in the source domain and labels of the samples and the unlabeled samples in the target domain are used for training, and labels of samples in the target domain are only used for a test process and do not participate in training.

4. The fault diagnosis method for a rolling bearing under variable working conditions based on a convolutional neural network and transfer learning according to claim 1, wherein Step 4 comprises:

Step 4.1: calculating classification loss of the samples in the source domain in the training process, wherein a process of the calculation is shown by the following formula:

$$\text{loss}_{classifier}(y, X) = \frac{1}{n} \sum_{i=0}^{n-1} J(y_i, F(x_i)),$$

wherein X represents a set of all samples in the source domain, and y represents a set of actual labels of all the samples in the source domain; n is a quantity of samples that participate in training, $y_i$ is an actual label of an $i^{th}$ sample, and $F(x_i)$ is a predicted result of the $i^{th}$ sample by a neural network; and $J(\cdot,\cdot)$ represents a cross entropy loss function, and is defined as follows:

$$J(p, q) = -\sum_{i=0}^{C-1} p_i \log(q_i),$$

wherein when i is an actual label of the sample, $p_i$ is equal to 1, or otherwise, $p_i$ is equal to 0; $q_i$ is a probability outputted after a softmax activation function; and C is a total quantity of label classes; and Step 4.2: combining the conditional distribution distance and a label training prediction loss of the samples in the source domain to form a multi-scale high-level feature alignment target function to be optimized, wherein a formula of the target function is as follows:

$$l_{total} = \min l_{classifier}(y_s, X_s) + \lambda \sum_{i=0}^{n_{sub}-1} d(g_i(X_s), g_i(X_t))$$
$$= \min_{F} \frac{1}{n_s} \sum_{i=0}^{n_s-1} J(y_i^s, F(x_i^s)) + \lambda \sum_{i=0}^{n_{sub}-1} d_H(g_i(X_s), g_i(X_t)),$$

wherein $F(\cdot)$ represents a model output function, $g(\cdot)$ represents an output of one substructure in the multi-scale feature extractor, $J(\cdot,\cdot)$ represents the cross entropy loss function, $\lambda > 0$ is a superparameter, $n_{sub}$ is equal to a quantity of substructures in the multi-scale feature extractor, and $d_{H'\cdot}$ is the conditional distribution distance; and the foregoing expression may be used to enable the network $F(\cdot)$ provided from training to accurately predict labels of samples from the target domain.

5. The fault diagnosis method for a rolling bearing under variable working conditions based on a convolutional neural network and transfer learning according to claim 4, wherein the superparameter $\lambda$ is set as follows:

$$\lambda = \frac{2}{1 + e^{\frac{-10*epoch}{epochs}}} - 1,$$

wherein epochs is a total quantity of times of training, and epoch is a current quantity of training steps.

6. The fault diagnosis method for a rolling bearing under variable working conditions based on a convolutional neural network and transfer learning according to claim 1, wherein Step 5 comprises:

feeding the unlabeled samples in the target domain into a trained multi-scale deep intra-class adaptation convolutional neural network model to obtain predicted labels of all samples in the target domain, and performing comparison with labels that are manually marked in advance but do not participate in a training process, to obtain diagnosis accuracy to verify a high quality of the model.

7. A computer device, comprising a memory, a processor, and a computer program that is stored in the memory and is executable by the processor, wherein the processor is configured to execute the program to implement the steps in the method according to claim 1.

8. A processor, configured to execute a program, wherein the program is executed to perform the method according to claim 1.

* * * * *